(12) United States Patent
Higgs

(10) Patent No.: US 7,606,870 B2
(45) Date of Patent: Oct. 20, 2009

(54) METHOD FOR DISPLAYING VENDOR NAME IN A CMTS COMMAND LINE INTERFACE

(75) Inventor: Duane Higgs, Lisle, IL (US)

(73) Assignee: Arris Group, Inc., Suwanee, GA (US)

( * ) Notice: Subject to any disclaimer, the term of this patent is extended or adjusted under 35 U.S.C. 154(b) by 804 days.

(21) Appl. No.: 11/041,844

(22) Filed: Jan. 24, 2005

(65) Prior Publication Data

US 2005/0165924 A1 Jul. 28, 2005

Related U.S. Application Data

(60) Provisional application No. 60/481,938, filed on Jan. 22, 2004.

(51) Int. Cl.
*G06F 15/167* (2006.01)
*G06F 17/30* (2006.01)

(52) U.S. Cl. .................. 709/216; 709/213; 709/214; 709/215; 707/3; 707/6; 707/10

(58) Field of Classification Search .......... 709/213–216
See application file for complete search history.

(56) References Cited

U.S. PATENT DOCUMENTS

| | | | |
|---|---|---|---|
| 6,363,423 B1 * | 3/2002 | Chiles et al. ................. | 709/224 |
| 6,587,855 B1 * | 7/2003 | Ellmann et al. ............... | 707/10 |
| 7,069,436 B1 * | 6/2006 | Akachi ....................... | 713/162 |
| 7,293,282 B2 * | 11/2007 | Danforth et al. ............... | 726/4 |
| 7,316,031 B2 * | 1/2008 | Griffith et al. ................ | 726/22 |
| 2004/0199789 A1 * | 10/2004 | Shaw et al. .................. | 713/201 |
| 2005/0160265 A1 * | 7/2005 | Tanaka et al. ............... | 713/168 |

* cited by examiner

*Primary Examiner*—Vivek Srivastava
*Assistant Examiner*—Thomas Duong
(74) *Attorney, Agent, or Firm*—Troy A. Van Aacken; Robert J. Starr

(57) ABSTRACT

An algorithm extracts a company ID from a LAN MAC address corresponding to a cable modem connected to a CMTS, cross-references the company ID to a corresponding company name in a company-name database, and then displays the company name in a command line user interface.

20 Claims, 1 Drawing Sheet

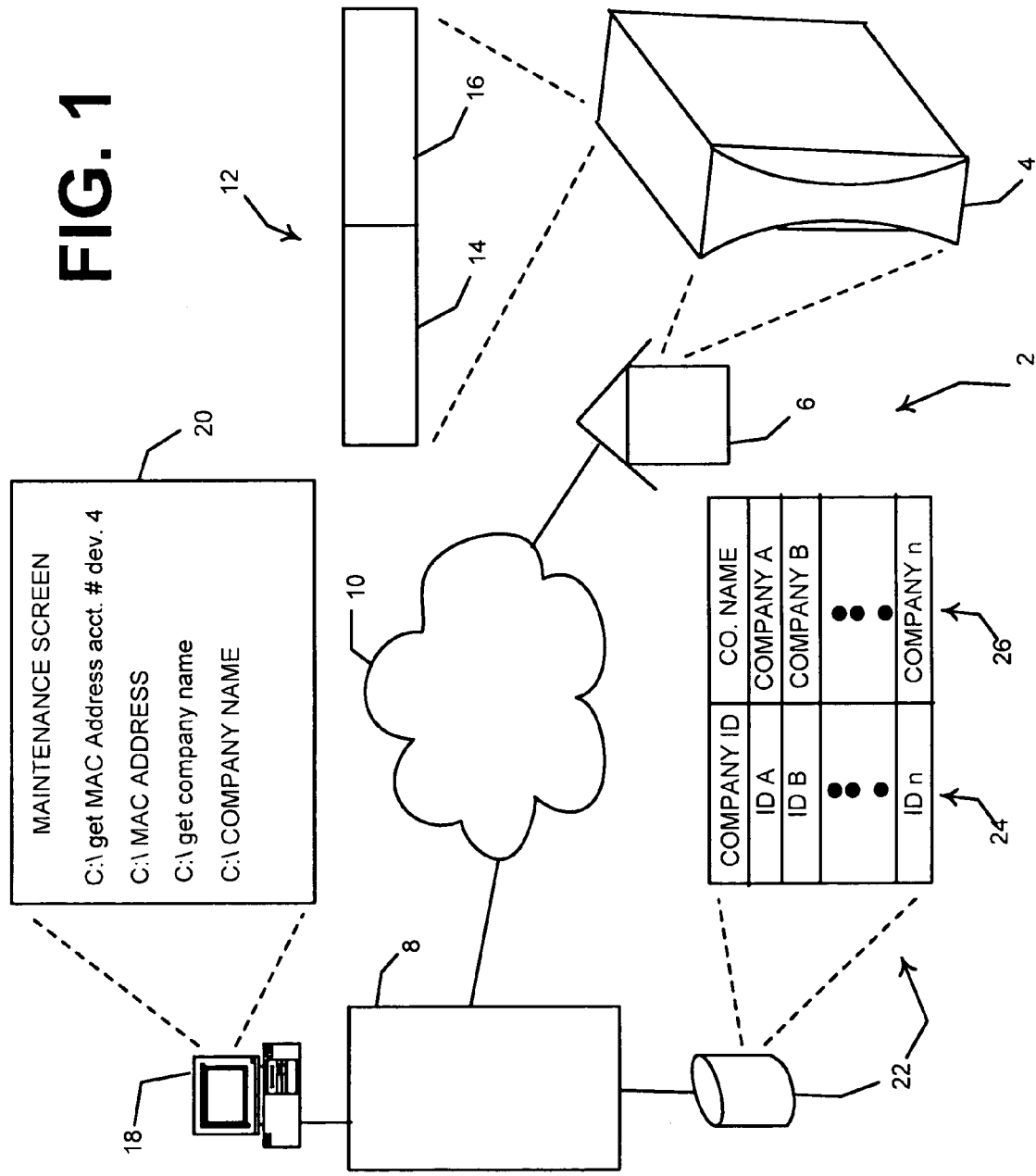

US 7,606,870 B2

METHOD FOR DISPLAYING VENDOR NAME IN A CMTS COMMAND LINE INTERFACE

CROSS REFERENCE TO RELATED APPLICATION

This application priority under 35 U.S.C. 119(e) to Higgs, U.S. provisional patent application No. 60/481,938 entitled "Vendor name usage when referencing CM devices in CMTS command line interface commands," which was filed Jan. 22, 2004, and is incorporated herein by reference in its entirety.

FIELD OF THE INVENTION

The present invention relates generally to communication devices, and more particularly to information displayed to operators of a cable modem termination system ("CMTS").

BACKGROUND

Cable data systems are used to allow cable TV subscribers to use the Hybrid-Fiber-Coax network as a communication link between their home networks and the Internet. As a result, computer information (Internet Protocol packets) can be transmitted across the Hybrid-Fiber-Coax network between home computers and the Internet. The DOCSIS specification (defined by CableLabs) specifies the set of protocols that must be used to effect a data transfer across the Hybrid-Fiber-Coax network. Two fundamental pieces of equipment permit this data transfer: a cable modem (CM) which is positioned in the subscriber's home, and a Cable Modem Termination System (CMTS) which is positioned in the head end of the cable TV company.

When managing and configuring a Cable data network, system administrators will often allow an external PC or workstation to connect (via a serial RS-232 connection or via a telnet connection through the Internet) to the CMTS. This connection will permit the system administrator to set configuration parameters or view performance information on both the CMTS and the attached CMs using Command Line Interface (CLI) commands. One of these CLI commands permits the system administrator to view information on all of the CMs that are currently connected to the CMTS.

When working as a system administrator in charge of maintaining a cable data network, one of the challenges is in the area of troubleshooting subscriber problems. Oftentimes, certain types of problems or anomalous behavior are seen only on CMs from a particular manufacturer or vendor. These types of problems can result from the unique design approach used by one vendor which may differ from the approach used by other vendors. As a result, it is sometimes helpful (when diagnosing a problem) to know the vendor for a particular cable modem.

For example, the system administrator may be aware that a certain type of outage can occur with a specific vendor's CM under heavy traffic load. To determine if an outage might be due to this overload condition, it is prudent for the system administrator to first determine if the suspected CM was manufactured by the specified vendor.

Thus, it would be beneficial to be able to quickly identify the vendor (or manufacturer) for a particular CM within the commonly used outputs from Command Line Interface commands that are issued to the CMTS. However, this information is not typically displayed on the Command Line Interface outputs. Display of the vendor name for each CM would be beneficial to have in the standard outputs for CMTS Command Line Interface outputs that reference the CM.

SUMMARY

The background above indicates that the display of the vendor identifier for each CM would be beneficial to have in the standard outputs for CMTS Command Line Interface outputs that reference the CM. This is possible only if there is a mechanism added to the CMTS for determining the vendor for a particular CM, and then actually displaying that vendor name on the output of appropriate Command Line Interface commands.

The MAC layer protocol of the DOCSIS specification uses the IEEE Organizationally Unique Identifier (OUI) or 'Company ID,' to generate 48-bit Universal LAN MAC addresses. These MAC addresses uniquely identify DOCSIS cable modem (CM) devices. The Company ID is the 24 bit high order value of the 48 bit MAC address. CM Vendor's request Company ID's from the IEEE Registration Authority as needed.

The Cable Modem Termination System's (CMTS's) knowledge of the thousands of possible subscriber devices that it manages is therefore based on the cable modem's MAC address. For the human operator, the MAC address is difficult to understand and often does not provide a full context. The inclusion of a database that maps "Company IDs" to "Company Name" provides further context to the operator. Using this database, Command Line Interface (CLI) output that references the modem's MAC address can also include a Company Name reference. This ID-to-Name mapping can also be used to provide filtering capabilities to view data related to CMs from a specific vendor.

BRIEF DESCRIPTION OF THE DRAWINGS

FIG. 1 illustrates a system for using a MAC address to display the maker of a communication device in a command line interface.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to the FIGURE, FIG. 1 illustrates a system 2 for connecting a cable modem 4 at a user location 6 to a cable modem termination system ("CMTS") 8. CMTS 8 and cable modem 4 are typically connected via network 10, which may include copper wire, optical fiber, or a combination thereof, as known in the art.

Cable modem 4 and other communication devices that are designed for communication using internet protocol ("IP"), typically have a unique identifier embedded into their circuitry. This unique identifier is typically a media access control ("MAC") address 12 that is embedded into the modem's 4 circuitry when it is manufactured. The MAC address 12 typically is a 48-bit identifier that is unique to the device into which it is embedded. Thus, one modem 4 from a manufacturing plant has a MAC address that is different from every other device from that same assembly plant. The twenty-four higher order bits 14 of the MAC address 12 typically refer to the manufacturer of the device. Thus, each set of higher order bits 14 of a device is typically the same as the higher order bits of every other similar device manufactured at the same manufacturing plant, and even other plants if made by the same manufacturer/vendor. However, the twenty-four lower bits 16 are typically what make each MAC address unique.

Since a MAC address 12 is just a collection of bits that may be stored on a memory device or circuit within the communication device 4, reading the MAC by a human is usually meaningless unless the reader looks at a table that helps decipher the meaning of the various parts of the address. For example, the upper bits 14 may be converted to a hexadecimal number for display on a computer monitor 18 that may be connected to CMTS 8, but the user at the CMTS needs to reference a chart that associates a given hexadecimal number with a particular manufacturer. Knowing the manufacturer helps a technician using computer 18 assist a user at location 6 correct a problem with their communication device 4.

To facilitate the technician determining the manufacturer of device 4 without having to manually consult a cross reference table, software running on computer 18 can retrieve a MAC address using a command entered into a command line user interface 20 that is displayed on monitor 18. The command entered into command line interface 20 may include the user's account number, for example, with the operator of CMTS 8. The account number information can be cross referenced with a table stored on the CMTS, or the account number can be sent to the CMTS, which can determine the device that is connected across network 10 that corresponds to the account number. When the account number is sent to the CMTS 8, the CMTS can return to computer 18 the MAC address of device 4, and use the higher order 24 bits 14 to determine the manufacture of the device.

This can be accomplished by using the upper bits 14 to perform a table lookup of company database 22, which is preferably indexed by the twenty-four higher order bit entries of MAC addresses. Each of these high order entries 24 associates a set of upper bits 14 with a company name stored in field 26, which is preferably stored as ASCII characters. The ASCII character entry 26 corresponding to the upper bits 14 of the MAC address 12 of device 4 being diagnosed by the user of computer 18 can then be displayed on command line interface 20, and the user of computer 18 can more effectively assist the user of device 4.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

I claim:

1. A method for providing a company name of a cable modem connected to a cable modem termination system over a network, comprising:
   receiving an account number of a user of the cable modem, the cable modem having a MAC address;
   receiving at least one first command to determine the company name associated with the MAC address of the cable modem;
   retrieving at least a set of higher order bits of the MAC address of the cable modem based on the account number, the set of higher order bits corresponding to a cable modem provider;
   locating the retrieved set of higher order bits in a company name database that associates sets of higher order bits with corresponding company names; and
   outputting the company name responsive to the at least one first command, the company name corresponding to the retrieved set of higher order bits.

2. The method of claim 1 wherein the set of higher order bits includes 24 bits.

3. The method of claim 1 wherein the cable modem provider is the manufacturer of an embedded media terminal adaptor.

4. The method of claim 1 wherein the cable modem provider is the vendor who provides the cable modem to an end user.

5. The method of claim 1 wherein the cable modem provider is the manufacturer of the cable modem.

6. The method of claim 1 wherein the outputted company name is adapted for display in a user interface that is a command line interface.

7. The method of claim 1 wherein the company name database is stored on a computer connected to the cable modem termination system.

8. The method of claim 1 wherein the set of higher order bits is an IEEE Organizational Unique Identifier (OUI).

9. The method of claim 1 wherein the outputting step utilizes a telnet connection.

10. The method of claim 1 wherein the outputting step utilizes an RS-232 connection.

11. The method of claim 1 wherein the outputted company name comprises ASCII characters.

12. The method of claim 1 further comprising:
   outputting the MAC address of the cable modem.

13. The method of claim 12 wherein the outputting of the MAC address of the cable modem is responsive to receiving at least one second command.

14. The method of claim 12 wherein the outputted MAC address is adapted for display as a hexadecimal number.

15. The method of claim 1 wherein the retrieving step further comprises completely obtaining the MAC address comprising the set of higher order bits and a set of lower order bits.

16. The method of claim 15 wherein the MAC address is an IEEE address.

17. The method of claim 16 wherein the IEEE address is a 48-bit address.

18. The method of claim 1 wherein the retrieving step further comprises obtaining at least the set of higher order bits of the MAC address of the cable modem from a table stored on the CMTS that associates the account number with the MAC address of the cable modem.

19. The method of claim 1 wherein the retrieving step further comprises obtaining at least the set of higher order bits of the MAC address of the cable modem from the CMTS through a determination of the cable modem connected over the network and associated with the account number.

20. A cable data system device that provides a company name of a cable modem connected to a cable modem termination system over a network, the device comprising:
   at least one connection configured to receive an account number of a user of the cable modem, the cable modem having a MAC address, the at least one connection further configured to receive at least one first command to determine the company name associated with the MAC address of the cable modem;

logic configured to retrieve at least a set of higher order bits of the MAC address of the cable modem based on the account number, the set of higher order bits corresponding to a cable modem provider;

a company name database that associates the retrieved set of higher order bits with the company name; and an interface configured to output the company name responsive to the at least one first command, the company name corresponding to the retrieved set of higher order bits.

* * * * *